United States Patent
Hong et al.

(10) Patent No.: US 11,030,961 B2
(45) Date of Patent: Jun. 8, 2021

(54) DC TO DC CONVERTER AND DISPLAY APPARATUS HAVING THE SAME

(71) Applicant: Samsung Display Co., Ltd., Yongin-si (KR)

(72) Inventors: Jin-Taek Hong, Hwaseong-si (KR); Songyi Han, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 73 days.

(21) Appl. No.: 16/221,021

(22) Filed: Dec. 14, 2018

(65) Prior Publication Data

US 2019/0197966 A1 Jun. 27, 2019

(30) Foreign Application Priority Data

Dec. 21, 2017 (KR) .................. 10-2017-0177583

(51) Int. Cl.
| | | |
|---|---|---|
| *G09G 3/34* | (2006.01) | |
| *H02M 3/06* | (2006.01) | |
| *H02M 1/088* | (2006.01) | |
| *H02M 3/156* | (2006.01) | |
| *H02M 1/00* | (2006.01) | |

(52) U.S. Cl.
CPC .......... *G09G 3/3406* (2013.01); *H02M 1/088* (2013.01); *H02M 3/06* (2013.01); *H02M 3/156* (2013.01); *G09G 2310/08* (2013.01); *G09G 2330/025* (2013.01); *G09G 2330/028* (2013.01); *H02M 2001/0009* (2013.01)

(58) Field of Classification Search
CPC ............. G09G 3/3406; G09G 2310/08; G09G 2330/025; G09G 2330/028; H02M 1/088; H02M 3/06; H02M 3/156; H02M 2001/0009
See application file for complete search history.

(56) References Cited

U.S. PATENT DOCUMENTS

| | | | | |
|---|---|---|---|---|
| 6,002,384 A | * | 12/1999 | Tamai | G09G 3/3688 345/95 |
| 9,058,774 B2 | * | 6/2015 | Ahn | G09G 3/3233 |
| 2003/0164813 A1 | * | 9/2003 | Fujii | G09G 3/3648 345/101 |
| 2004/0201407 A1 | * | 10/2004 | Lee | H03F 3/2171 327/172 |
| 2006/0022649 A1 | * | 2/2006 | Lee | H05B 41/28 323/225 |
| 2006/0255743 A1 | * | 11/2006 | Choi | H05B 41/2806 315/39.51 |

(Continued)

FOREIGN PATENT DOCUMENTS

| | | |
|---|---|---|
| KR | 10-2005-0010559 | 1/2005 |
| KR | 10-2012-0133471 | 12/2012 |

*Primary Examiner* — Sejoon Ahn
(74) *Attorney, Agent, or Firm* — Lewis Roca Rothgerber Christie LLP

(57) ABSTRACT

A DC to DC converter includes: an input voltage source; an inductor connected to the input voltage source; a diode connected to the inductor; a capacitor connected to the diode; a plurality of switching elements connected to a node between the inductor and the diode in a parallel connection; and a controller configured to set duty ratios of currents flowing through the switching elements such that the duty ratios of the currents flowing through the switching elements are equal to each other.

19 Claims, 10 Drawing Sheets

(56) References Cited

U.S. PATENT DOCUMENTS

| | | | | |
|---|---|---|---|---|
| 2007/0097057 A1* | 5/2007 | Shin | ............... | G09G 3/3614 |
| | | | | 345/98 |
| 2008/0252275 A1* | 10/2008 | Martin | ............... | H02M 3/156 |
| | | | | 323/282 |
| 2009/0146588 A1* | 6/2009 | Okamura | ............... | H02M 3/156 |
| | | | | 318/139 |
| 2010/0207863 A1* | 8/2010 | Yen | ............... | G09G 3/3648 |
| | | | | 345/98 |
| 2010/0254108 A1* | 10/2010 | Kim | ............... | H05K 1/181 |
| | | | | 361/782 |
| 2011/0140615 A1* | 6/2011 | Min | ............... | H05B 45/37 |
| | | | | 315/185 R |
| 2013/0235090 A1* | 9/2013 | Choi | ............... | H05B 45/46 |
| | | | | 345/690 |
| 2014/0312806 A1* | 10/2014 | Kim | ............... | H05B 45/382 |
| | | | | 315/307 |
| 2015/0239363 A1* | 8/2015 | Brockerhoff | ............... | B60L 11/1848 |
| | | | | 701/22 |
| 2017/0257027 A1* | 9/2017 | Yamamoto | ............... | H02P 27/06 |

\* cited by examiner

DC TO DC CONVERTER AND DISPLAY APPARATUS HAVING THE SAME

CROSS-REFERENCE TO RELATED APPLICATION

The present application claims priority to and the benefit of Korean Patent Application No. 10-2017-0177583, filed on Dec. 21, 2017 in the Korean Intellectual Property Office KIPO, the entire content of which is herein incorporated by reference in its entirety.

BACKGROUND

1. Field

Aspects of some example embodiments of the present invention relate to a DC to DC converter and a display apparatus including the DC to DC converter.

2. Description of the Related Art

A display apparatus may include a display panel and a backlight unit providing light to the display panel. The display apparatus may further include a display panel driver driving the display panel and a backlight driver driving the backlight unit.

The display panel driver and the backlight driver may include a DC to DC converter to shift a voltage level. The DC to DC converter may include a switching element. In addition, the DC to DC converter may include a plurality of switching elements for voltage converting of the high level.

When threshold voltages of the switching elements are not equal to each other, the DC to DC converter may generate heat.

The above information disclosed in this Background section is only for enhancement of understanding of the background and therefore it may contain information that does not constitute prior art.

SUMMARY

Aspects of some example embodiments of the present invention relate to a DC to DC converter and a display apparatus including the DC to DC converter. For example, some example embodiments of the present invention relate to a DC to DC converter including a plurality of switching elements and compensating differences of threshold voltages of the switching elements and a display apparatus including the DC to DC converter.

Aspects of some example embodiments of the present invention may include a DC to DC converter including a plurality of switching elements and compensating difference of threshold voltages of the switching elements.

Aspects of some example embodiments of the present invention may also include a display apparatus including the DC to DC converter.

According to some example embodiments, a DC to DC converter includes an input voltage source, an inductor, a diode, a capacitor, a plurality of switching elements and a controller. The inductor is connected to the input voltage source. The diode is connected to the inductor. The capacitor is connected to the diode. The switching elements are connected to a node between the inductor and the diode in a parallel connection. The controller sets duty ratios of currents flowing through the switching elements such that the duty ratios of the currents flowing through the switching elements are equal to each other.

According to some example embodiments, the switching elements may include a first switching element and a second switching element. The controller may include a main operator which compares a first duty ratio of a first current flowing through the first switching element and a second duty ratio of a second current flowing through the second switching element, decreases the first duty ratio when the first duty ratio is greater than the second duty ratio and decreases the second duty ratio when the second duty ratio is greater than the first duty ratio.

According to some example embodiments, the DC to DC converter may further include a first resistor connected to the first switching element in series, the first resistor sensing the first current and a second resistor connected to the second switching element in series, the second resistor sensing the second current.

According to some example embodiments, the controller may further include a first amplifier comprising a first input terminal connected to a first end of the first resistor and a second input terminal connected to a second end of the first resistor and an output terminal, the first amplifier amplifying the first current, a second amplifier comprising a first input terminal connected to a first end of the second resistor and a second input terminal connected to a second end of the second resistor and an output terminal, the second amplifier amplifying the second current, a first counter which determines the first duty ratio of the amplified first current and a second counter which determines the second duty ratio of the amplified second current.

According to some example embodiments, the controller may further include a first comparator comprising a first input terminal receiving a first duty ratio control signal from the main operator and a compensating signal, a second input terminal receiving a clock signal and an output terminal, a second comparator comprising a first input terminal receiving a second duty ratio control signal from the main operator and the compensating signal, a second input terminal receiving the clock signal and an output terminal, a first buffer which transmits a first control voltage outputted from the output terminal of the first comparator to a control electrode of the first switching element and a second buffer which transmits a second control voltage outputted from the output terminal of the second comparator to a control electrode of the second switching element.

According to some example embodiments, the controller may further include a first delay circuit which delays timing of the first control voltage and a second delay circuit which delays timing of the second control voltage.

According to some example embodiments, the first delay circuit may include a first group of buffers including the first buffer and a first group of switches which sets a path of transmitting the first control voltage. The second delay circuit may include a second group of buffers including the second buffer and a second group of switches which sets a path of transmitting the second control voltage.

According to some example embodiments, the switching elements may further include a third switching element. The DC to DC converter may further include a third resistor connected to the third switching element in series, the third resistor sensing a third current flowing through the third switching element.

According to some example embodiments, the controller may further include a third amplifier comprising a first input terminal connected to a first end of the third resistor and a second input terminal connected to a second end of the third resistor and an output terminal, the third amplifier amplifying the third current and a third counter which determines a third duty ratio of the amplified third current.

According to some example embodiments, the controller may further include a third comparator comprising a first input terminal receiving a third duty ratio control signal from the main operator and the compensating signal, a second input terminal receiving the clock signal and an output terminal and a third buffer which transmits a third control voltage outputted from the output terminal of the third comparator to a control electrode of the third switching element.

According to some example embodiments of the present invention, a display apparatus includes a display panel, a gate driver, a data driver, a backlight unit and a backlight driver. The display panel displays an image. The gate driver outputs a gate signal to the display panel. The data driver outputs a data voltage to the display panel. The backlight unit provides light to the display panel. The backlight driver outputs a backlight driving signal to drive the backlight unit to the backlight unit. The backlight driver includes a DC to DC converter. The DC to DC converter includes an input voltage source, an inductor, a diode, a capacitor, a plurality of switching elements and a controller. The inductor is connected to the input voltage source. The diode is connected to the inductor. The capacitor is connected to the diode. The switching elements are connected to a node between the inductor and the diode in a parallel connection. The controller sets duty ratios of currents flowing through the switching elements such that the duty ratios of the currents flowing through the switching elements are equal to each other.

According to some example embodiments, the switching elements may include a first switching element and a second switching element. The controller may include a main operator which compares a first duty ratio of a first current flowing through the first switching element and a second duty ratio of a second current flowing through the second switching element, decreases the first duty ratio when the first duty ratio is greater than the second duty ratio and decreases the second duty ratio when the second duty ratio is greater than the first duty ratio.

According to some example embodiments, the DC to DC converter may further include a first resistor connected to the first switching element in series, the first resistor sensing the first current and a second resistor connected to the second switching element in series, the second resistor sensing the second current.

According to some example embodiments, the controller may further include a first amplifier comprising a first input terminal connected to a first end of the first resistor and a second input terminal connected to a second end of the first resistor and an output terminal, the first amplifier amplifying the first current, a second amplifier comprising a first input terminal connected to a first end of the second resistor and a second input terminal connected to a second end of the second resistor and an output terminal, the second amplifier amplifying the second current, a first counter which determines the first duty ratio of the amplified first current and a second counter which determines the second duty ratio of the amplified second current.

According to some example embodiments, the controller may further include a first comparator comprising a first input terminal receiving a first duty ratio control signal from the main operator and a compensating signal, a second input terminal receiving a clock signal and an output terminal, a second comparator comprising a first input terminal receiving a second duty ratio control signal from the main operator and the compensating signal, a second input terminal receiving the clock signal and an output terminal, a first buffer which transmits a first control voltage outputted from the output terminal of the first comparator to a control electrode of the first switching element and a second buffer which transmits a second control voltage outputted from the output terminal of the second comparator to a control electrode of the second switching element.

According to some example embodiments of the present invention, a display apparatus includes a display panel, a gate driver, a data driver and a power voltage generator. The display panel displays an image. The gate driver outputs a gate signal to the display panel. The data driver outputs a data voltage to the display panel. The power voltage generator outputs a gate power voltage to the gate driver and a data power voltage to the data driver. The power voltage generator includes a DC to DC converter. The DC to DC converter includes an input voltage source, an inductor, a diode, a capacitor, a plurality of switching elements and a controller. The inductor is connected to the input voltage source. The diode is connected to the inductor. The capacitor is connected to the diode. The switching elements are connected to a node between the inductor and the diode in a parallel connection. The controller sets duty ratios of currents flowing through the switching elements such that the duty ratios of the currents flowing through the switching elements are equal to each other.

According to some example embodiments, the DC to DC converter may generate a gate on voltage which defines a high level of the gate signal.

According to some example embodiments, the DC to DC converter may generate an analog power voltage to operate the data driver.

According to some example embodiments, the switching elements may include a first switching element and a second switching element. The controller may include a main operator which compares a first duty ratio of a first current flowing through the first switching element and a second duty ratio of a second current flowing through the second switching element, decreases the first duty ratio when the first duty ratio is greater than the second duty ratio and decreases the second duty ratio when the second duty ratio is greater than the first duty ratio.

According to some example embodiments of the present invention, a DC to DC converter includes a plurality of switching elements so that voltage converting of the high level may be operated. In addition, the difference of the threshold voltages of the switching elements is compensated so that the heat of the DC to DC converter including the switching elements may be prevented. Thus, the DC voltage having the high level may be stably generated so that the reliability of the DC to DC converter and the display apparatus including the DC to DC converter may be enhanced.

BRIEF DESCRIPTION OF THE DRAWINGS

The above and other features and aspects of the present inventive concept will become more apparent by describing in more detail aspects of some example embodiments thereof with reference to the accompanying drawings, in which.

DETAILED DESCRIPTION

Hereinafter, aspects of some example embodiments of the present invention will be explained in more detail with reference to the accompanying drawings.

Figure 1:
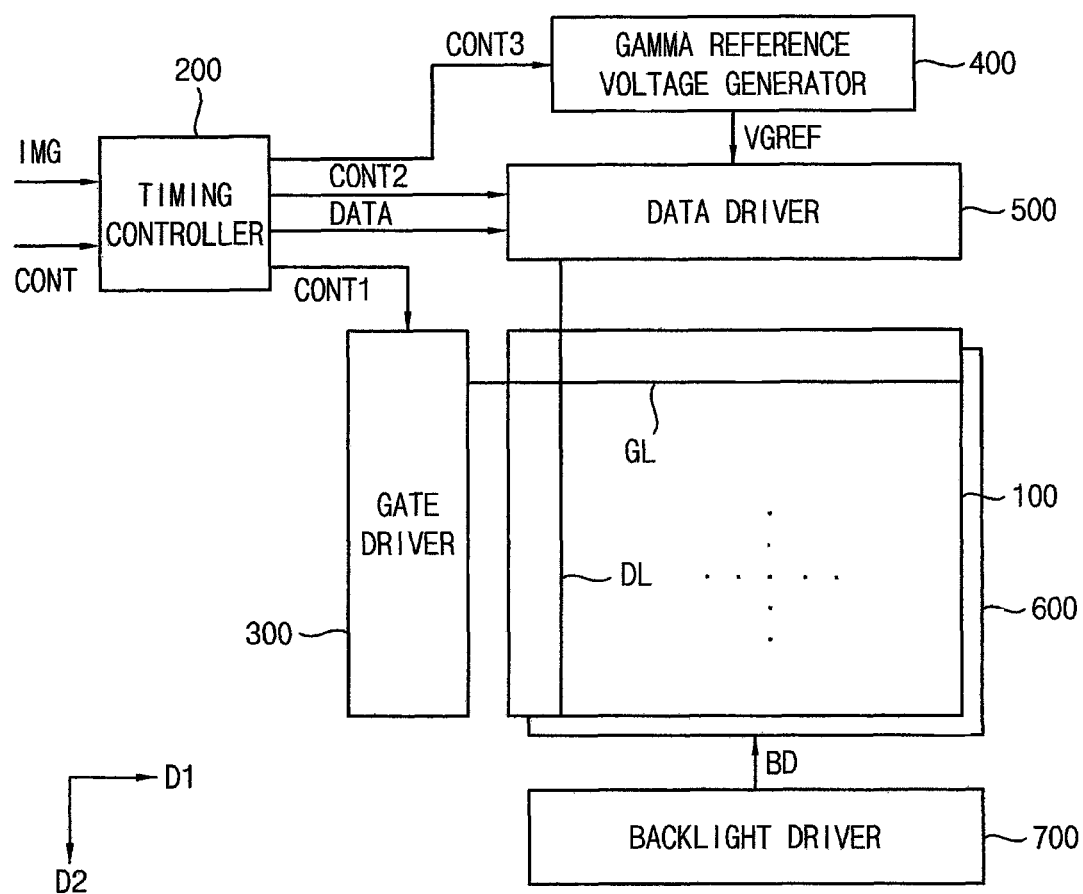
FIG. 1 is a block diagram illustrating a display apparatus according to some example embodiments of the present invention.

FIG. 1 is a block diagram illustrating a display apparatus according to some example embodiments of the present invention.

Referring to FIG. 1, the display apparatus includes a display panel 100, a display panel driver, a backlight unit 600 and a backlight driver 700. The display panel driver includes a timing controller 200, a gate driver 300, a gamma reference voltage generator 400, and a data driver 500.

The display panel 100 includes an active region configured to display an image and a peripheral region adjacent to the active region where images are not displayed. For example, the display panel 100 may be a display panel of a liquid crystal display apparatus which includes a liquid crystal layer.

The display panel 100 includes a plurality of gate lines GL, a plurality of data lines DL and a plurality of subpixels SP electrically connected to the gate lines GL and the data lines DL. The gate lines GL extend in a first direction D1 and the data lines DL extend in a second direction D2 crossing the first direction D1.

The timing controller 200 receives input image data IMG and an input control signal CONT from an external apparatus. For example, the input image data IMG may include red image data, green image data and blue image data. The input control signal CONT may include a master clock signal and a data enable signal. The input control signal CONT may further include a vertical synchronizing signal and a horizontal synchronizing signal.

The timing controller 200 generates a first control signal CONT1, a second control signal CONT2, a third control signal CONT3, and a data signal DATA based on the input image data IMG and the input control signal CONT.

The timing controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The timing controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The timing controller 200 generates the data signal DATA based on the input image data IMG. The timing controller 200 outputs the data signal DATA to the data driver 500.

The timing controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals driving the gate lines GL in response to the first control signal CONT1 received from the timing controller 200. For example, the gate driver 300 may sequentially output the gate signals to the gate lines GL.

The gamma reference voltage generator 400 generates a gamma reference voltage VGREF in response to the third control signal CONT3 received from the timing controller 200. The gamma reference voltage generator 400 provides the gamma reference voltage VGREF to the data driver 500. The gamma reference voltage VGREF has a value corresponding to a level of the data signal DATA.

According to some example embodiments, the gamma reference voltage generator 400 may be located within the timing controller 200, or within the data driver 500.

The data driver 500 receives the second control signal CONT2 and the data signal DATA from the timing controller 200, and receives the gamma reference voltages VGREF from the gamma reference voltage generator 400. The data driver 500 converts the data signals DATA into data voltages having an analog type using the gamma reference voltages VGREF. The data driver 500 outputs the data voltages to the data lines DL.

The backlight unit 600 provides light to the display panel 100. The backlight unit 600 may be positioned under the display panel 100. The backlight unit 600 may include a plurality of light emitting diodes.

The backlight driver 700 outputs a backlight driving signal BD to drive the backlight unit 600 to the backlight unit 600. The backlight driver 700 may include a DC to DC converter to increase a voltage level. The structure and the operation of the DC to DC converter may be explained referring to FIGS. 2 to 5 in detail.

Figure 2:
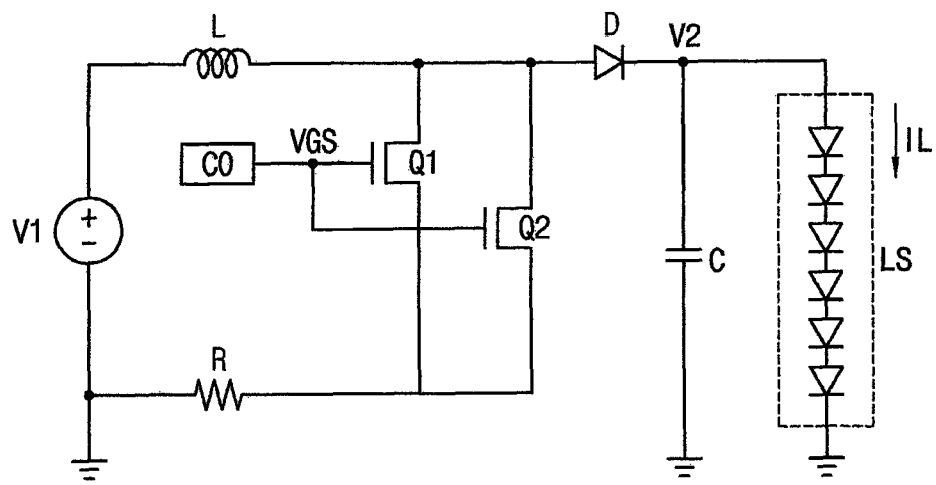
FIG. 2 is a circuit diagram illustrating a DC to DC converter of a backlight driver of FIG. 1.
Figure 3:
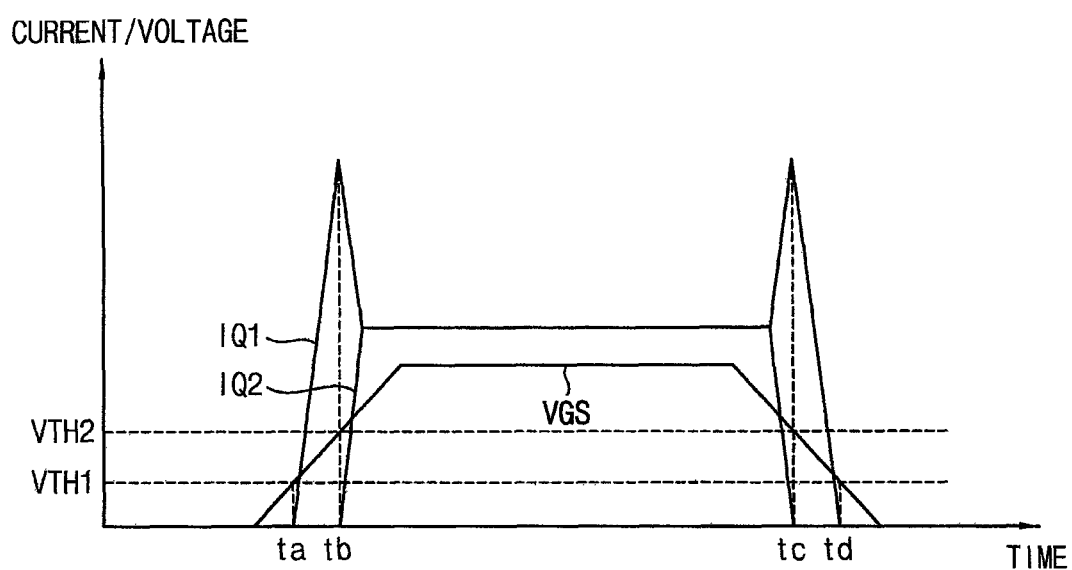
FIG. 3 is a timing diagram illustrating waveforms of a current flowing through a first switching element of FIG. 2, a current flowing through a second switching element of FIG. 2 and a voltage applied to control electrodes of the first and second switching elements of FIG. 2.

FIG. 2 is a circuit diagram illustrating the DC to DC converter of the backlight driver 700 of FIG. 1. FIG. 3 is a timing diagram illustrating waveforms of a current IQ1 flowing through a first switching element Q1 of FIG. 2, a current IQ2 flowing through a second switching element Q2 of FIG. 2 and a voltage applied to control electrodes of the first and second switching elements Q1 and Q2 of FIG. 2.

Referring to FIGS. 1 and 2, the DC to DC converter includes an input voltage source V1, an inductor L, a diode D, a capacitor C, a plurality of switching elements Q1 and Q2 and a controller CO. The DC to DC converter may further include a resistor R.

The inductor L is connected to the input voltage source V1. The diode D is connected to the inductor L. The capacitor C is connected to the diode D. The switching elements Q1 and Q2 are connected to a node between the inductor L and the diode D in a parallel connection. The controller CO sets duty ratios of currents flowing through the switching elements Q1 and Q2 such that the duty ratio of the current flowing through a first switching element Q1 and the duty ratio of the current flowing through a second switching element Q2 are equal to each other.

For example, the input voltage source V1 may include a positive electrode connected to a first end of the inductor L and a negative electrode connected to a ground. The inductor L may include the first end connected to the positive electrode of the input voltage source V1 and a second end connected to an anode electrode of the diode D.

The diode D may include the anode electrode connected to the second end of the inductor L and a cathode electrode connected to a first electrode of the capacitor C. The capacitor C may include the first electrode connected to the cathode electrode of the diode D and a second electrode connected to the ground.

According to some example embodiments, the switching elements Q1 and Q2 may include the first switching element Q1 and the second switching element Q2. The first switching element Q1 may include a control electrode connected to the controller CO, an input electrode connected to the second end of the inductor L and an output electrode connected to the first end of the resistor R. The second switching element Q2 may include a control electrode connected to the controller CO, an input electrode connected to the second end of the inductor L and an output electrode connected to the first end of the resistor R.

The resistor R may include the first end connected to the output electrodes of the first and second switching elements Q1 and Q2 and a second end connected to the ground.

The controller CO may output a control voltage VGS which swings between a high level and a low level. For example, the control voltage VGS may be a pulse width modulation signal. When the control voltage VGS exceeds a threshold voltage of the first switching element Q1, the first switching element Q1 is turned on. When the control voltage VGS exceeds a threshold voltage of the second switching element Q2, the second switching element Q2 is turned on.

When the first switching element Q1 is turned on, a first current path is generated through the input voltage source V1, the inductor L and the first switching element Q1 and an energy is accumulated at the inductor L.

When the second switching element Q2 is turned on, a second current path is generated through the input voltage source V1, the inductor L and the second switching element Q2 and an energy is accumulated at the inductor L.

When the first and second switching elements Q1 and Q2 are turned off, a third current path is generated through the input voltage source V1, the inductor L, and the diode D and the energy accumulated at the inductor L is added to an input voltage V1 from the input voltage source V1 so that the current flows to a load LS through the diode D. According to some example embodiments, the load LS may be a string of light emitting diodes. An output voltage V2 greater than the input voltage V1 is applied to the load LS.

When the DC to DC converter includes a single switching element, a capacity of the DC to DC converter may be limited. The DC to DC converter may include the plurality of switching elements Q1 and Q2 to increase the capacity of the DC to DC converter. When two DC to DC converter are employed, a manufacturing cost may be doubled so that the DC to DC converter may include two switching elements and the single inductor L, the single diode D and the single capacitor C may be commonly used.

Referring to FIG. 3, the threshold voltages of the plurality of switching elements Q1 and Q2 may have different values due to process variation. For example, the first switching element Q1 may have a first threshold voltage VTH1 and the second switching element Q2 may have a second threshold voltage VTH2. For example, the first threshold voltage VTH1 may be less than the second threshold voltage VTH2.

As the control voltage VGS increases, the first switching element Q1 having the first threshold voltage VTH1 which is less than the second threshold voltage VTH2 is turned on earlier at a first time ta. From the first time ta to a second time tb, the first switching element Q1 is turned on and the second switching element Q2 is turned off so that a current IQ1 flowing through the first switching element Q1 sharply increases. After the second switching element Q2 is also turned on, the current flows through both the first switching element Q1 and the second switching element Q2 so that the current IQ1 flowing through the first switching element Q1 decreases.

In addition, as the control voltage VGS decreases, the second switching element Q2 having the second threshold voltage VTH2 which is greater than the first threshold voltage VTH1 is turned off earlier at a third time tc. From the third time tc to a fourth time td, the first switching element Q1 is turned on and the second switching element Q2 is turned off so that the current IQ1 flowing through the first switching element Q1 sharply increases again.

Between the first time to and the second time tb, high current flows through the first switching element Q1 so that heat may be generated at the first switching element Q1. In addition, between the third time tc and the fourth time td, high current flows through the first switching element Q1 so that heat may be generated at the first switching element Q1.

Figure 4:
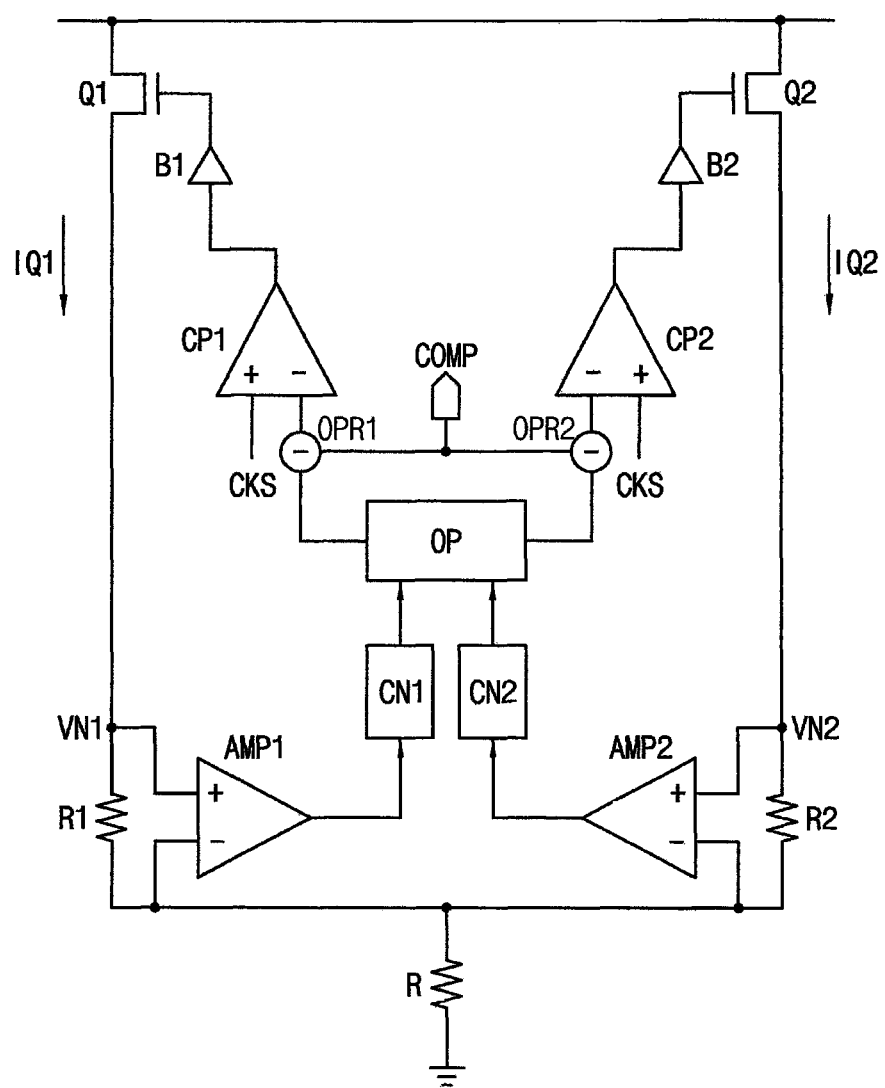
FIG. 4 is a circuit diagram illustrating a controller for the DC to DC converter of FIG. 2.
Figure 5:
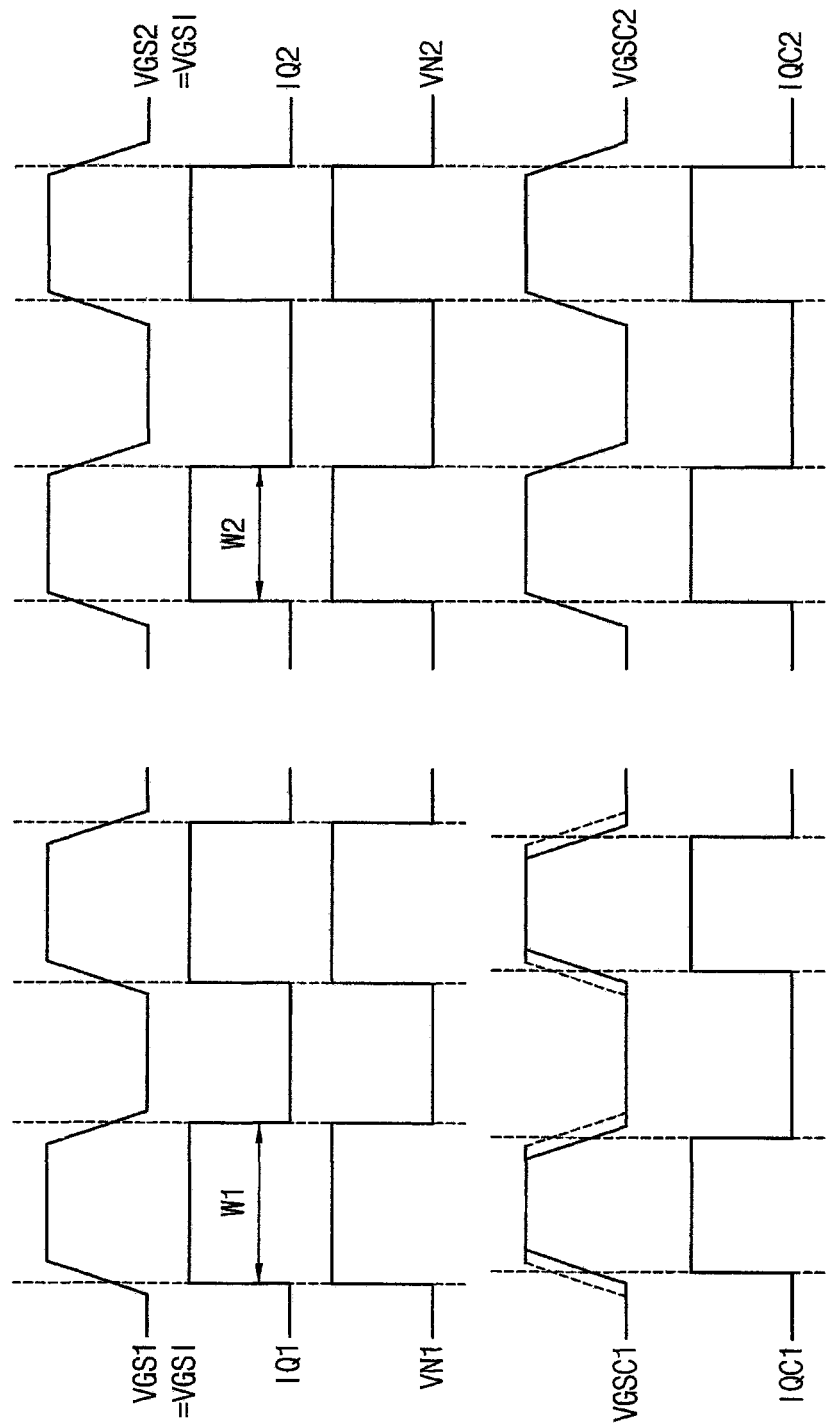
FIG. 5 is a timing diagram illustrating signals of the controller of FIG. 4.

FIG. 4 is a circuit diagram illustrating the controller CO for the DC to DC converter of FIG. 2. FIG. 5 is a timing diagram illustrating signals of the controller CO of FIG. 4.

Referring to FIGS. 1 to 5, the controller CO may include a main operator OP comparing a first duty ratio of a first current IQ1 flowing through the first switching element Q1 and a second duty ratio of a second current IQ2 flowing through the second switching element Q2, decreasing the first duty ratio when the first duty ratio is greater than the second duty ratio and decreasing the second duty ratio when the second duty ratio is greater than the first duty ratio.

For example, the main operator OP may decrease a duty ratio of a first control voltage VGS1 applied to the control electrode of the first switching element Q1 to decrease the first duty ratio of the first current IQ1. For example, the main operator OP may decrease a duty ratio of a second control voltage VGS2 applied to the control electrode of the second switching element Q2 to decrease the second duty ratio of the second current IQ2.

In FIG. 5, the first threshold voltage VTH1 of the first switching element Q1 is less than the second threshold voltage VTH2 of the second switching element Q2 and accordingly the first duty ratio W1 of the first current IQ1 may be greater than the second duty ratio W2 of the second current IQ2. The main operator OP decreases the duty ratio of the first control voltage VGS1 to generate a first converted control signal VGSC1. Accordingly, a duty ratio of a first converted current IQC1 is decreased compared to the duty ratio of the first current IQ1. In contrast, the main operator OP maintains the duty ratio of the second control voltage VGS2 to generate a second converted control signal VGSC2. Accordingly, a duty ratio of a second converted current IQC2 may be equal to (or substantially equal to) the duty ratio of the second current IQ2.

Although the main operator OP may move backward a rising edge of the first current IQ1 and move forward a falling edge of the first current IQ1 to decrease the first duty ratio in the present example embodiment as explained with respect to FIG. 5, embodiments of the present invention are not limited thereto. According to some embodiments, the main operator OP may merely move forward the falling edge of the first current IQ1 with maintaining the rising edge of the first current IQ1 to decrease the first duty ratio. According to some embodiments, the main operator OP may merely move backward the rising edge of the first current IQ1 with maintaining the falling edge of the first current IQ1 to decrease the first duty ratio.

When the first duty ratio is equal to the second duty ratio, the main operator OP may maintain the duty ratios of the first control voltage VGS1 and the second control voltage VGS2.

The DC to DC converter may further include a first resistor R1 connected to the first switching element Q1 in series and a second resistor R2 connected to the second switching element Q2 in series. The first resistor R1 may sense the first current IQ1. The second resistor R2 may sense the second current IQ2. A voltage applied to a first end of the first resistor R1 may be a first node voltage VN1. A voltage applied to a first end of the second resistor R2 may be a second node voltage VN2.

The controller CO may further include a first amplifier AMP1 and a second amplifier AMP2. The first amplifier AMP1 includes a first input terminal connected to the first end of the first resistor R1 and a second input terminal connected to a second end of the first resistor R1 and an output terminal. The first amplifier AMP1 amplifies the first current IQ1. The second amplifier AMP2 includes a first input terminal connected to the first end of the second resistor R2 and a second input terminal connected to a second end of the second resistor R2 and an output terminal. The second amplifier AMP2 amplifies the second current IQ2. The first amplifier AMP1 may amplify the first node voltage VN1. The second amplifier AMP2 may amplifier the second node voltage VN2.

The controller CO may further include a first counter CN1 and a second counter CN2. The first counter CN1 determines the first duty ratio of the amplified first current IQ1. The second counter CN2 determines the second duty ratio of the amplified second current IQ2. The first counter CN1 counts high levels of the first current IQ1 in a predetermined cycle to determine the first duty ratio. The second counter CN2 counts high levels of the second current IQ2 in a cycle (e.g., a predetermined cycle) to determine the second duty ratio.

The controller CO may further include a first comparator CP1 and a second comparator CP2. The first comparator CP1 includes a first input terminal receiving a first duty ratio control signal from the main operator OP and a compensating signal COMP, a second input terminal receiving a clock signal CKS and an output terminal. The second comparator CP2 includes a first input terminal receiving a second duty ratio control signal from the main operator OP and the compensating signal COMP, a second input terminal receiving the clock signal CKS and an output terminal.

The controller CO may further include a first operator OPR1 positioned between the main operator OP and the first input terminal of the first comparator CP1. The first operator OPR1 may operate the first duty ratio control signal and the compensating signal COMP. The controller CO may further include a second operator OPR2 positioned between the main operator OP and the first input terminal of the second comparator CP2. The second operator OPR2 may operate the second duty ratio control signal and the compensating signal COMP.

The clock signal CLS may have a sawtooth waveform. The first comparator CP1 may generate the first control voltage VGSC1 based on the first duty ratio control signal and the compensating signal COMP using the clock signal CKS. The second comparator CP2 may generate the second control voltage VGSC2 based on the second duty ratio control signal and the compensating signal COMP using the clock signal CKS.

The compensating signal COMP is a signal fed back from the DC to DC converter. When a level of the output voltage of the DC to DC converter is greater than a target level, the duty ratio of the first control voltage VGSC1 and the duty ratio of the second control voltage VGSC2 may be decreased. When the level of the output voltage of the DC to DC converter is less than the target level, the duty ratio of the first control voltage VGSC1 and the duty ratio of the second control voltage VGSC2 may be increased.

As shown in FIG. 5, the first control voltage VGS1 and the second control voltage VGS2 outputted from the main operator OP in an initial step are called to an initial control voltage VGS1. In the initial step, the first control voltage VGS1 and the second control voltage VGS2 may be equal to each other.

The first control voltage VGSC1 having the adjusted duty ratio to compensate the difference of the threshold voltages, after the first current IQ1 and the second current IQ2 are sensed, may be different from the initial control voltage VGS1.

The controller CO may further include a first buffer B1 and a second buffer B2. The first buffer B1 transmits the first control voltage VGSC1 outputted from the output terminal of the first comparator CP1 to the control electrode of the first switching element Q1. The second buffer B2 transmits the second control voltage VGSC2 outputted from the output terminal of the second comparator CP2 to the control electrode of the second switching element Q2.

According to some example embodiments of the present invention, the DC to DC converter includes the plurality of switching element Q1 and Q2 so that the voltage converting of the high level may be operated. In addition, the difference of the threshold voltages of the switching elements Q1 and Q2 is compensated so that the heat of the DC to DC converter including the switching elements Q1 and Q2 may be prevented. Thus, the DC voltage having the high level may be stably generated so that the reliability of the DC to DC converter and the display apparatus including the DC to DC converter may be enhanced.

Figure 6:
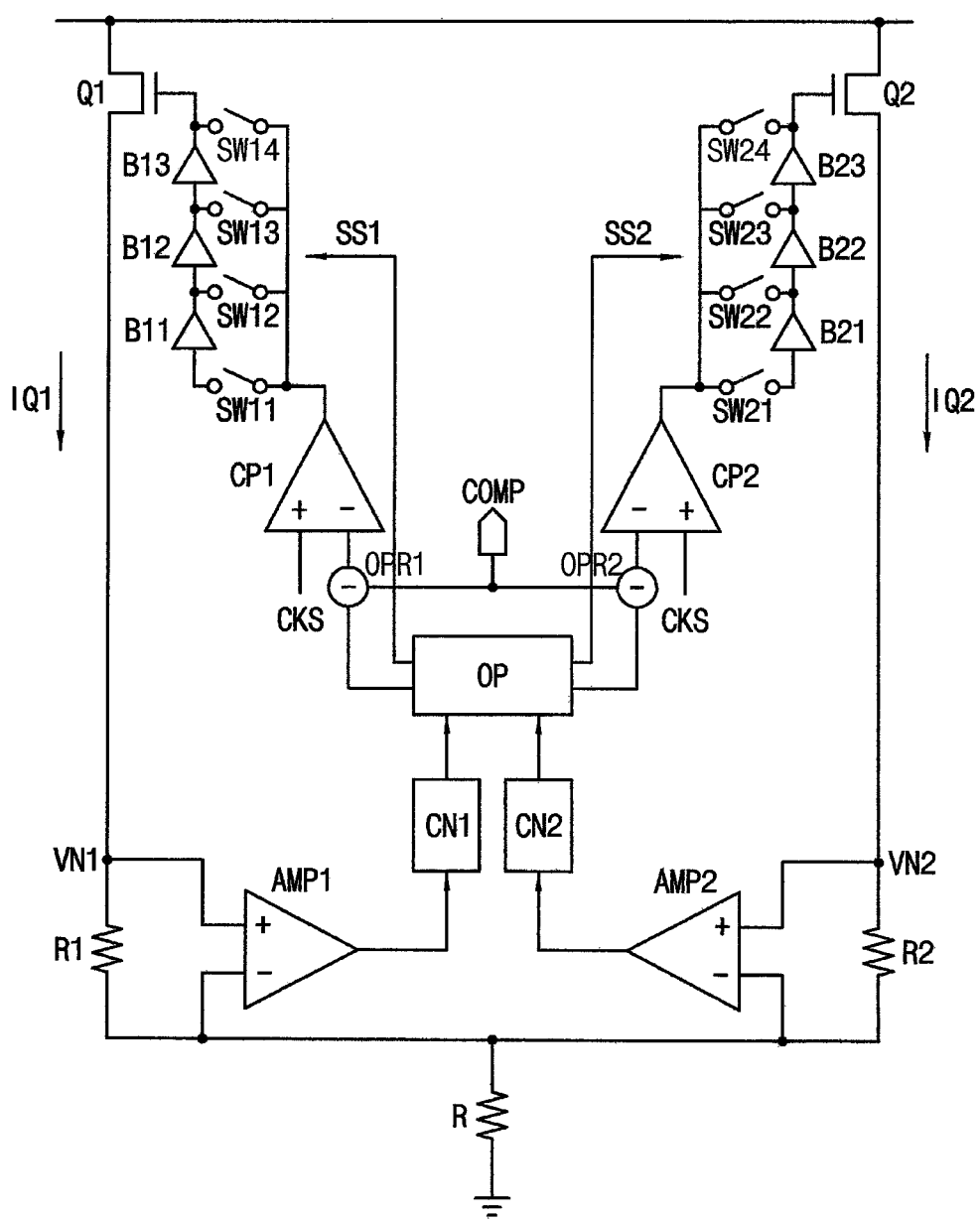
FIG. 6 is a circuit diagram illustrating a controller for a DC to DC converter according to some example embodiments of the present invention.
Figure 7A:
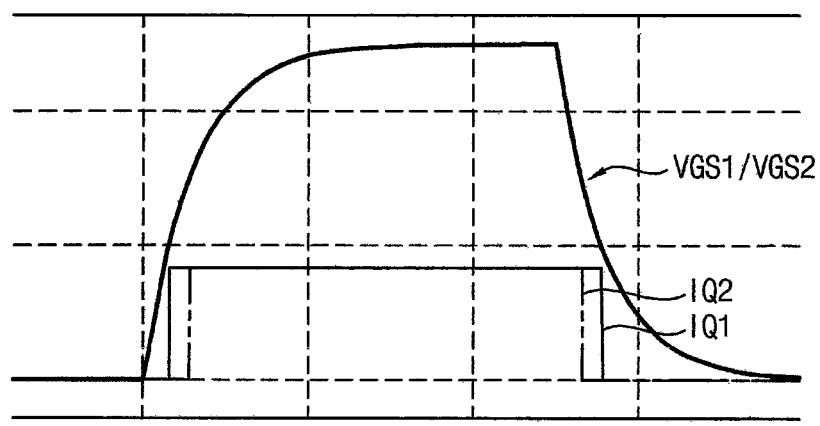
FIG. 7A is a timing diagram illustrating a current flowing through a first switching element of FIG. 6 and a current flowing through a second switching element of FIG. 6 before compensating.
Figure 7B:
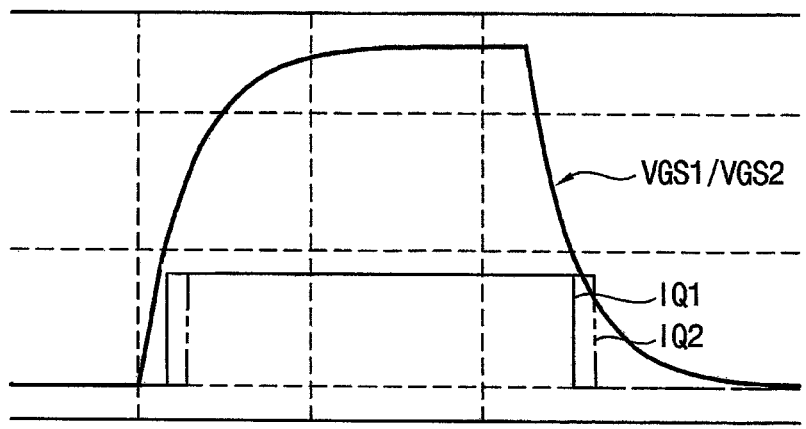
FIG. 7B is a timing diagram illustrating a current flowing through the first switching element of FIG. 6 and a current flowing through the second switching element of FIG. 6 after a duty ratio is compensated by the controller of FIG. 6.
Figure 7C:
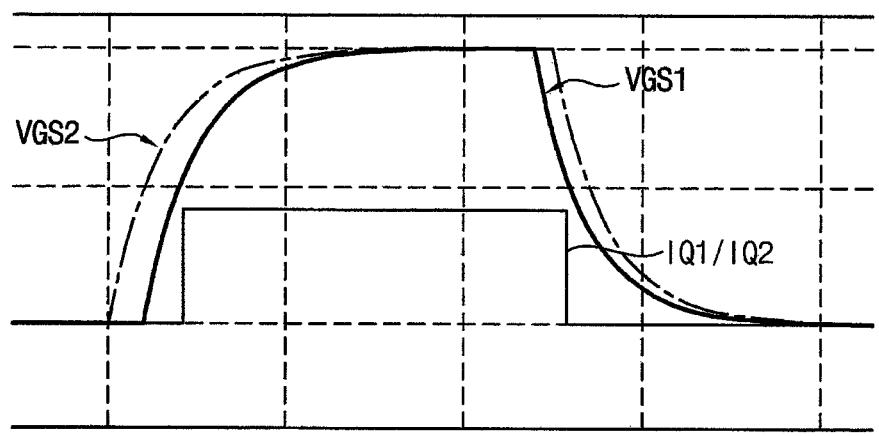
FIG. 7C is a timing diagram illustrating a current flowing through the first switching element of FIG. 6 and a current flowing through the second switching element of FIG. 6 after a timing is compensated by the controller of FIG. 6.

FIG. 6 is a circuit diagram illustrating a controller for a DC to DC converter according to some example embodiments of the present invention. FIG. 7A is a timing diagram illustrating a current flowing through a first switching element of FIG. 6 and a current flowing through a second switching element of FIG. 6 before compensating. FIG. 7B is a timing diagram illustrating a current flowing through the first switching element of FIG. 6 and a current flowing through the second switching element of FIG. 6 after a duty ratio is compensated by the controller of FIG. 6. FIG. 7C is a timing diagram illustrating a current flowing through the first switching element of FIG. 6 and a current flowing through the second switching element of FIG. 6 after a timing is compensated by the controller of FIG. 6.

The display apparatus according to some example embodiments of the present invention is substantially the same as the display apparatus of the example embodiment explained referring to FIGS. 1 to 5 except that the controller of the DC to DC converter further includes delaying circuits. Thus, the same reference numerals will be used to refer to the same or like parts as those described in the previous example embodiment of FIGS. 1 to 5 and some repetitive explanation concerning the above elements will be omitted.

Referring to FIGS. 1 to 3 and 6 to 7C, the display apparatus includes a display panel 100, a display panel driver, a backlight unit 600 and a backlight driver 700. The display panel driver includes a timing controller 200, a gate driver 300, a gamma reference voltage generator 400 and a data driver 500.

The backlight unit 600 provides light to the display panel 100. The backlight unit 600 may be positioned under the display panel 100. The backlight unit 600 may include a plurality of light emitting diodes.

The backlight driver 700 outputs a backlight driving signal BD to drive the backlight unit 600 to the backlight unit 600. The backlight driver 700 may include a DC to DC converter to increase a voltage level.

The DC to DC converter includes an input voltage source V1, an inductor L, a diode D, a capacitor C, a plurality of switching elements Q1 and Q2 and a controller CO. The DC to DC converter may further include a resistor R.

In some example embodiments, the plurality of the switching elements Q1 and Q2 may include a first switching element Q1 and a second switching element Q2.

The controller CO may output a control voltage VGS which swings between a high level and a low level. When the control voltage VGS exceeds a threshold voltage of the first switching element Q1, the first switching element Q1 is turned on. When the control voltage VGS exceeds a threshold voltage of the second switching element Q2, the second switching element Q2 is turned on.

When the first switching element Q1 is turned on, a first current path is generated through the input voltage source V1, the inductor L and the first switching element Q1 and an energy is accumulated at the inductor L.

When the second switching element Q2 is turned on, a second current path is generated through the input voltage source V1, the inductor L and the second switching element Q2 and an energy is accumulated at the inductor L.

When the first and second switching elements Q1 and Q2 are turned off, a third current path is generated through the input voltage source V1, the inductor L and the diode D and the energy accumulated at the inductor L is added to an input voltage V1 from the input voltage source V1 so that the current flows to a load LS through the diode D. In the present example embodiment, the load LS may be a string of light emitting diodes. An output voltage V2 greater than the input voltage V1 is applied to the load LS.

The controller CO may include a main operator OP comparing a first duty ratio of a first current IQ1 flowing through the first switching element Q1 and a second duty ratio of a second current IQ2 flowing through the second switching element Q2, decreasing the first duty ratio when the first duty ratio is greater than the second duty ratio and decreasing the second duty ratio when the second duty ratio is greater than the first duty ratio.

The DC to DC converter may further include a first resistor R1 connected to the first switching element Q1 in series and a second resistor R2 connected to the second switching element Q2 in series. The first resistor R1 may sense the first current IQ1. The second resistor R2 may sense the second current IQ2.

The controller CO may further include a first amplifier AMP1 and a second amplifier AMP2. The first amplifier AMP1 includes a first input terminal connected to the first end of the first resistor R1 and a second input terminal connected to a second end of the first resistor R1 and an output terminal. The first amplifier AMP1 amplifies the first current IQ1. The second amplifier AMP2 includes a first input terminal connected to the first end of the second resistor R2 and a second input terminal connected to a second end of the second resistor R2 and an output terminal. The second amplifier AMP2 amplifies the second current IQ2.

The controller CO may further include a first counter CN1 and a second counter CN2. The first counter CN1 determines the first duty ratio of the amplified first current IQ1. The second counter CN2 determines the second duty ratio of the amplified second current IQ2.

The controller CO may further include a first comparator CP1 and a second comparator CP2. The first comparator CP1 includes a first input terminal receiving a first duty ratio control signal from the main operator OP and a compensating signal COMP, a second input terminal receiving a clock signal CKS and an output terminal. The second comparator CP2 includes a first input terminal receiving a second duty ratio control signal from the main operator OP and the compensating signal COMP, a second input terminal receiving the clock signal CKS and an output terminal.

According to some example embodiments, the controller CO may further include a first delay circuit delaying a timing of the first control voltage VGSC1 and a second delaying circuit delaying a timing of the second control voltage VGSC2.

The first delay circuit may include a first group of buffers B11, B12 and B13 and a first group of switches SW11, SW12, SW13 and SW14 to set a path of transmitting the first control voltage VGSC1.

When the first control signal VGSC1 outputted from the first comparator CP1 is directly applied to the control electrode of the first switching element Q1 without passing the buffers B11, B12 and B13 by a fourth switch SW14, the timing of the first control signal VGSC1 may be earliest.

When the first control signal VGSC1 outputted from the first comparator CP1 is applied to the control electrode of the first switching element Q1 through a third buffer B13 by a third switch SW13, the timing of the first control signal VGSC1 may be delayed compared to the above case.

When the first control signal VGSC1 outputted from the first comparator CP1 is applied to the control electrode of the first switching element Q1 through a second buffer B12 and the third buffer B13 by a second switch SW12, the timing of the first control signal VGSC1 may be further delayed compared to the above case.

When the first control signal VGSC1 outputted from the first comparator CP1 is applied to the control electrode of the first switching element Q1 through a first buffer B12, the second buffer B12 and the third buffer B13 by a first switch SW11, the timing of the first control signal VGSC1 may be further delayed compared to the above case.

The second delay circuit may include a second group of buffers B21, B22 and B23 and a second group of switches SW21, SW22, SW23 and SW24 to set a path of transmitting the second control voltage VGSC2. The operation of the second delay circuit may be substantially the same as the operation of the first delay circuit explained above.

Referring to FIG. 7A, the threshold voltage of the first switching element Q1 may be less than the threshold voltage of the second switching element Q2. Accordingly, the duty ratio of the first current IQ1 flowing through the first switching element Q1 is greater than the duty ratio of the second current IQ2 flowing through the second switching element Q2. Thus, the heat may be generated at the first switching element Q1.

Referring to FIG. 7B, the duty ratio of the first current IQ1 passing through the first switching element Q1 may be decreased using the controller CO such that the duty ratio of the first current IQ1 is equal to the duty ratio of the second current IQ2 passing through the second switching element Q2. When the duty ratio of the first current IQ1 is decreased, a phase of the first current IQ1 may not be guaranteed to be equal to a phase of the second current IQ2. When the duty ratio of the first current IQ1 is decreased, the phase of the first current IQ1 may be equal to the phase of the second current IQ2 but the phase of the first current IQ1 may not be equal to the phase of the second current IQ2.

When the rising timing and the falling timing of the first current IQ1 are not equal to the rising timing and the falling timing of the second current IQ2, a time duration when the first switching element Q1 is turned on but the second switching element Q2 is turned off may exist. In contrast, a time when the second switching element Q2 is turned on but the first switching element Q1 is turned off may exist. When the current flows only through the first switching element Q1, the heat may be generated at the first switching element Q1. In contrast, when the current flows only through the second switching element Q2, the heat may be generated at the second switching element Q2.

Referring to FIG. 7C, the timings of the first current IQ1 and the second current IQ2 may be adjusted using the first delay circuit and the second delay circuit. When the duty ratio and the timings (e.g., the rising timings and the falling timings) of the first current IQ1 and the second current IQ2 are equal to each other, the heat may not be generated at the first switching element Q1 and the second switching element Q2.

According to some example embodiments of the present invention, the DC to DC converter includes the plurality of switching element Q1 and Q2 so that the voltage converting of the high level may be operated. In addition, the difference of the threshold voltages of the switching elements Q1 and Q2 is compensated so that the heat of the DC to DC converter including the switching elements Q1 and Q2 may be prevented or reduced. Thus, the DC voltage having the high level may be stably generated so that the reliability of the DC to DC converter and the display apparatus including the DC to DC converter may be enhanced.

Figure 8:
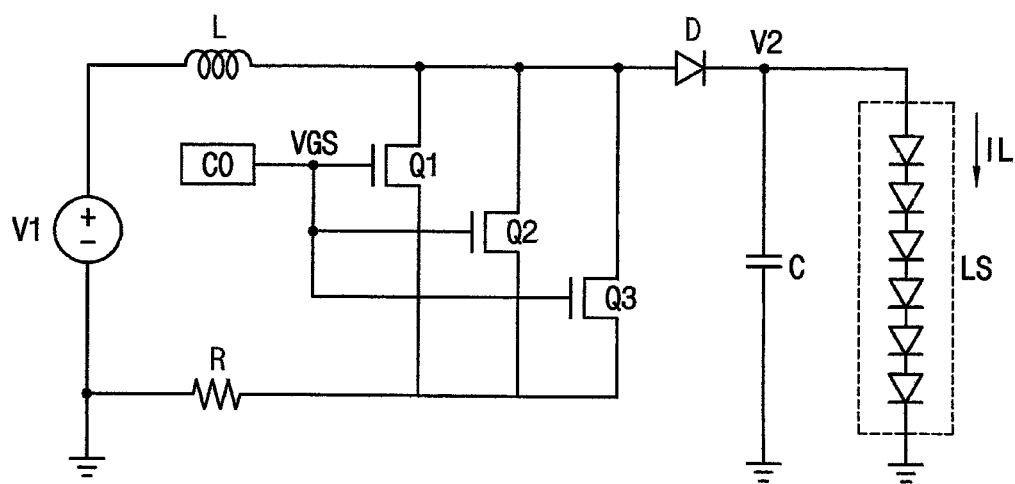
FIG. 8 is a circuit diagram illustrating a DC to DC converter of a backlight driver according to some example embodiments of the present invention.
Figure 9:
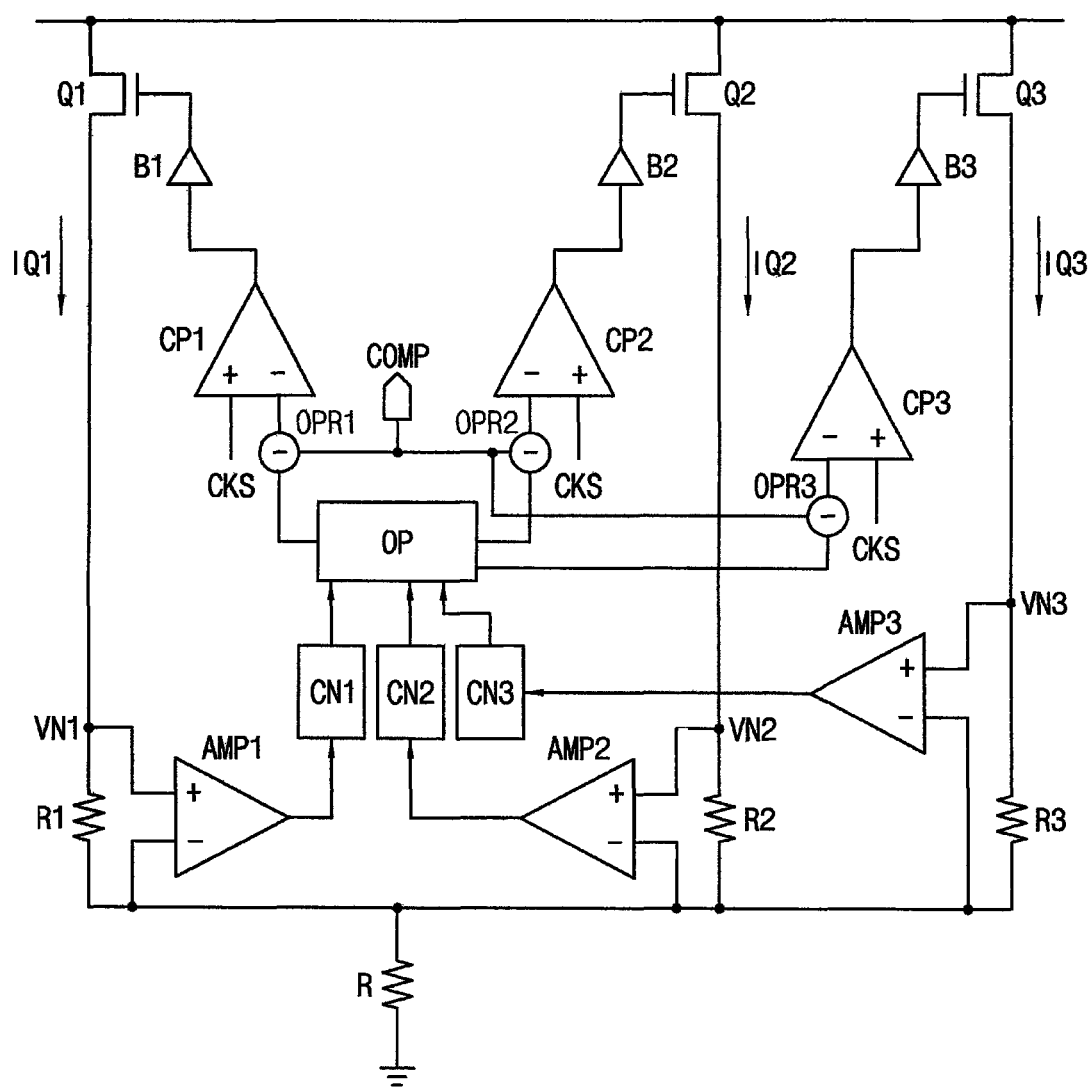
FIG. 9 is a circuit diagram illustrating a controller for the DC to DC converter of FIG. 8.

FIG. 8 is a circuit diagram illustrating a DC to DC converter of a backlight driver 700 according to some example embodiments of the present invention. FIG. 9 is a circuit diagram illustrating a controller CO for the DC to DC converter of FIG. 8.

The display apparatus illustrated with respect to FIGS. 8 and 9 is substantially the same as the display apparatus of the example embodiment explained referring to FIGS. 1 to 5 except that the DC to DC converter includes three switching elements. Thus, the same reference numerals will be used to refer to the same or like parts as those described in the previous example embodiment of FIGS. 1 to 5 and some repetitive explanation concerning the above elements will be omitted.

Referring to FIGS. 1, 8 and 9, the display apparatus includes a display panel 100, a display panel driver, a backlight unit 600 and a backlight driver 700. The display panel driver includes a timing controller 200, a gate driver 300, a gamma reference voltage generator 400 and a data driver 500.

The backlight unit 600 provides light to the display panel 100. The backlight unit 600 may be positioned under the display panel 100. The backlight unit 600 may include a plurality of light emitting diodes.

The backlight driver 700 outputs a backlight driving signal BD to drive the backlight unit 600 to the backlight unit 600. The backlight driver 700 may include a DC to DC converter to increase a voltage level.

The DC to DC converter includes an input voltage source V1, an inductor L, a diode D, a capacitor C, a plurality of switching elements Q1, Q2 and Q3 and a controller CO. The DC to DC converter may further include a resistor R.

In some example embodiments, the plurality of switching elements Q1, Q2 and Q3 may include a first switching element Q1, a second switching element Q2 and a third switching element Q3.

The controller CO may output a control voltage VGS which swings between a high level and a low level. When the control voltage VGS exceeds a threshold voltage of the first switching element Q1, the first switching element Q1 is turned on. When the control voltage VGS exceeds a threshold voltage of the second switching element Q2, the second switching element Q2 is turned on. When the control voltage VGS exceeds a threshold voltage of the third switching element Q3, the third switching element Q3 is turned on.

When the first switching element Q1 is turned on, a first current path is generated through the input voltage source V1, the inductor L and the first switching element Q1 and an energy is accumulated at the inductor L.

When the second switching element Q2 is turned on, a second current path is generated through the input voltage source V1, the inductor L and the second switching element Q2 and an energy is accumulated at the inductor L.

When the third switching element Q3 is turned on, a third current path is generated through the input voltage source V1, the inductor L and the third switching element Q3 and an energy is accumulated at the inductor L.

When the first, second and third switching elements Q1, Q2 and Q3 are turned off, a fourth current path is generated through the input voltage source V1, the inductor L and the diode D and the energy accumulated at the inductor L is added to an input voltage V1 from the input voltage source V1 so that the current flows to a load LS through the diode D. According to some example embodiments, the load LS may be a string of light emitting diodes. An output voltage V2 greater than the input voltage V1 is applied to the load LS.

The controller CO may include a main operator OP comparing a first duty ratio of a first current IQ1 flowing through the first switching element Q1, a second duty ratio of a second current IQ2 flowing through the second switching element Q2 and a third duty ratio of a third current IQ3 flowing through the third switching element Q3, decreasing the first duty ratio when the first duty ratio is greater than the second and third duty ratios, decreasing the second duty ratio when the second duty ratio is greater than the third and first duty ratios and decreasing the third duty ratio when the third duty ratio is greater than the first and two duty ratios.

The DC to DC converter may further include a first resistor R1 connected to the first switching element Q1 in series, a second resistor R2 connected to the second switching element Q2 in series and a third resistor R3 connected to the third switching element Q3 in series. The first resistor R1 may sense the first current IQ1. The second resistor R2 may sense the second current IQ2. The third resistor R3 may sense the third current IQ3.

The controller CO may further include a first amplifier AMP1, a second amplifier AMP2 and a third amplifier AMP3. The first amplifier AMP1 includes a first input terminal connected to the first end of the first resistor R1 and a second input terminal connected to a second end of the first resistor R1 and an output terminal. The first amplifier AMP1 amplifies the first current IQ1. The second amplifier AMP2 includes a first input terminal connected to the first end of the second resistor R2 and a second input terminal connected to a second end of the second resistor R2 and an output terminal. The second amplifier AMP2 amplifies the second current IQ2. The third amplifier AMP3 includes a first input terminal connected to the first end of the third resistor R3 and a second input terminal connected to a second end of the third resistor R3 and an output terminal. The third amplifier AMP3 amplifies the third current IQ3.

The controller CO may further include a first counter CN1, a second counter CN2 and a third counter CN3. The first counter CN1 determines the first duty ratio of the amplified first current IQ1. The second counter CN2 determines the second duty ratio of the amplified second current IQ2. The third counter CN3 determines the third duty ratio of the amplified third current IQ3.

The controller CO may further include a first comparator CP1, a second comparator CP2 and a third comparator CP3. The first comparator CP1 includes a first input terminal receiving a first duty ratio control signal from the main operator OP and a compensating signal COMP, a second input terminal receiving a clock signal CKS and an output terminal. The second comparator CP2 includes a first input terminal receiving a second duty ratio control signal from the main operator OP and the compensating signal COMP, a second input terminal receiving the clock signal CKS and an output terminal. The third comparator CP3 includes a first input terminal receiving a third duty ratio control signal from the main operator OP and the compensating signal COMP, a third input terminal receiving the clock signal CKS and an output terminal.

The controller CO may further include a first operator OPR1 positioned between the main operator OP and the first input terminal of the first comparator CP1. The first operator OPR1 may operate the first duty ratio control signal and the compensating signal COMP. The controller CO may further include a second operator OPR2 positioned between the main operator OP and the first input terminal of the second comparator CP2. The second operator OPR2 may operate the second duty ratio control signal and the compensating signal COMP. The controller CO may further include a third operator OPR3 positioned between the main operator OP and the first input terminal of the third comparator CP3. The third operator OPR3 may operate the third duty ratio control signal and the compensating signal COMP.

The controller CO may further include a first buffer B1, a second buffer B2 and a third buffer B3. The first buffer B1 transmits the first control voltage VGSC1 outputted from the output terminal of the first comparator CP1 to the control electrode of the first switching element Q1. The second buffer B2 transmits the second control voltage VGSC2 outputted from the output terminal of the second comparator CP2 to the control electrode of the second switching element Q2. The third buffer B3 transmits the third control voltage VGSC3 outputted from the output terminal of the third comparator CP3 to the control electrode of the third switching element Q3.

Although not explained referring to figures, the controller CO according to some example embodiments may further include the delay circuits which are explained referring to FIG. 6.

According to some example embodiments, the DC to DC converter includes the plurality of switching element Q1, Q2 and Q3 so that the voltage converting of the high level may be operated. In addition, the difference of the threshold voltages of the switching elements Q1, Q2 and Q3 is compensated so that the heat of the DC to DC converter including the switching elements Q1, Q2 and Q3 may be prevented. Thus, the DC voltage having the high level may be stably generated so that the reliability of the DC to DC converter and the display apparatus including the DC to DC converter may be enhanced.

Figure 10:
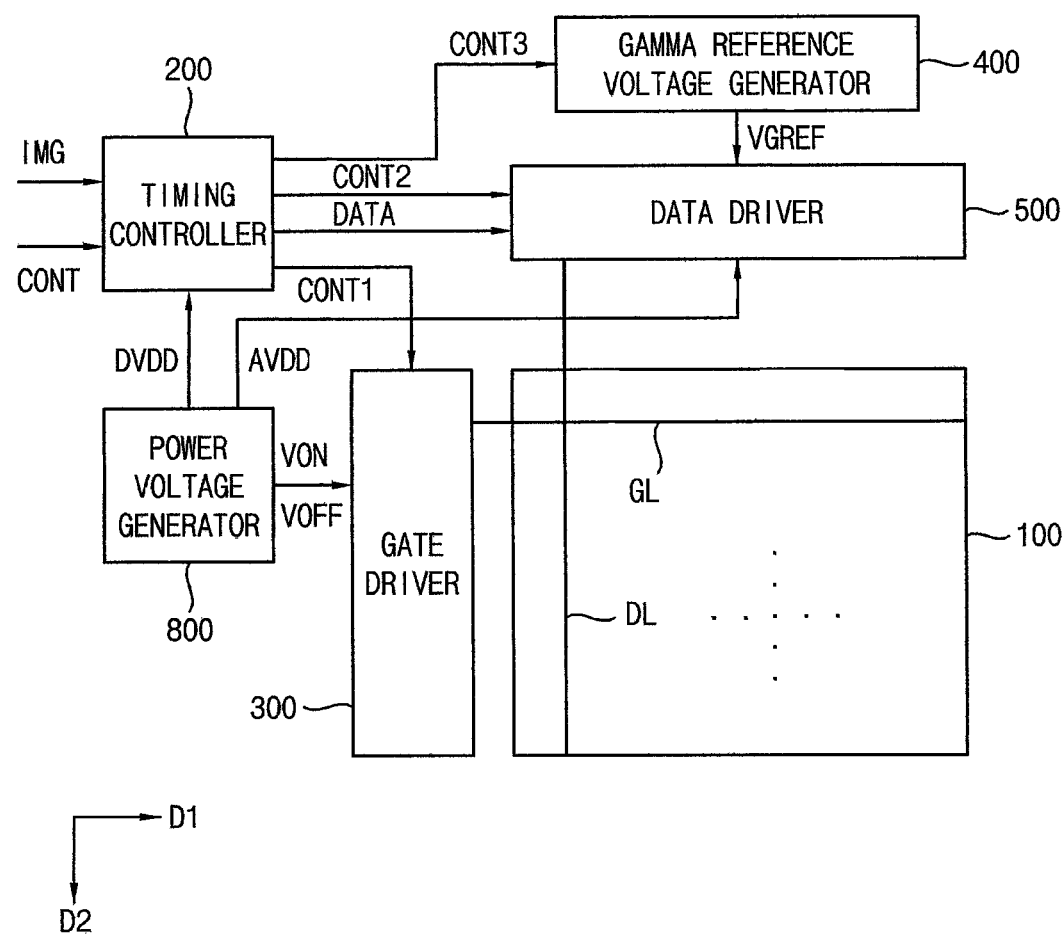
FIG. 10 is a block diagram illustrating a display apparatus according to some example embodiments of the present invention.
Figure 11:
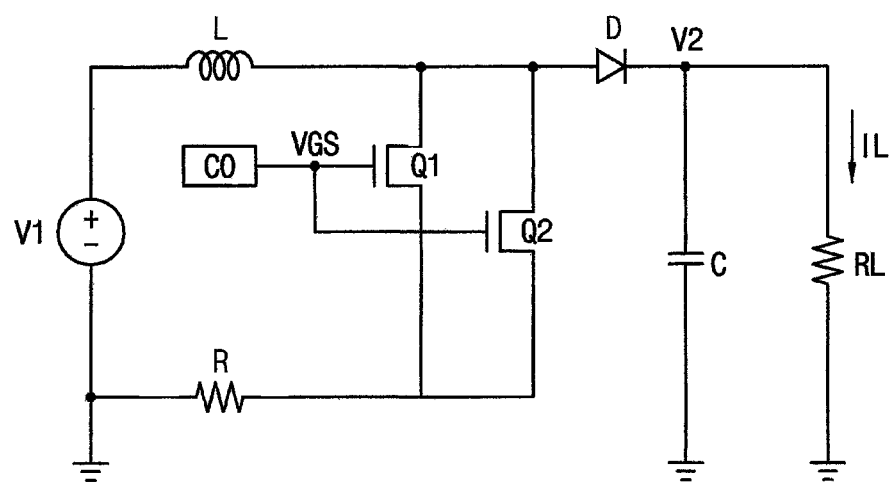
FIG. 11 is a circuit diagram illustrating a DC to DC converter of a power voltage generator of FIG. 10.

FIG. 10 is a block diagram illustrating a display apparatus according to some example embodiments of the present invention. FIG. 11 is a circuit diagram illustrating a DC to DC converter of a power voltage generator of FIG. 10.

The display apparatus according to the embodiment illustrated with respect to FIGS. 10 and 11 is substantially the same as the display apparatus of the previous example embodiment explained referring to FIGS. 1 to 5 except that the power voltage generator includes the DC to DC converter. Thus, the same reference numerals will be used to refer to the same or like parts as those described in the previous example embodiment of FIGS. 1 to 5 and some repetitive explanation concerning the above elements will be omitted.

Referring to FIGS. 3 to 5, 10 and 11, the display apparatus includes a display panel 100 and a display panel driver. The display panel driver includes a timing controller 200, a gate driver 300, a gamma reference voltage generator 400, a data driver 500 and a power voltage generator 800.

The power voltage generator 800 generates power voltages to drive the display panel 100. For example, the power voltage generator 800 may generate a gate power voltage VON and VOFF and output the gate power voltage VON and VOFF to the gate driver 300. For example, the power voltage generator 800 may generate a data power voltage AVDD and output the data power voltage AVDD to the data driver 500. For example, the power voltage generator 800 may generate a timing control power voltage DVDD and output the timing control power voltage DVDD to the timing controller 200. For example, the power voltage generator 800 may generate a gamma power voltage and output the gamma power voltage to the gamma reference voltage generator 400.

The power voltage generator 800 may include the DC to DC converter. For example, the DC to DC converter may generate a gate on voltage VON which defines a high level of the gate signal. The DC to DC converter may generate an analog power voltage AVDD for an operation of the data driver 500.

The DC to DC converter includes an input voltage source V1, an inductor L, a diode D, a capacitor C, a plurality of switching elements Q1 and Q2 and a controller CO. The DC to DC converter may further include a resistor R.

In some example embodiments, the plurality of the switching elements Q1 and Q2 may include a first switching element Q1 and a second switching element Q2. According to some example embodiments, the plurality of the switching elements Q1, Q2 and Q3 may include a first switching element Q1, and a second switching element Q2 and a third switching element Q3 as shown in FIG. 9.

The controller CO may output a control voltage VGS which swings between a high level and a low level. When the control voltage VGS exceeds a threshold voltage of the first switching element Q1, the first switching element Q1 is turned on. When the control voltage VGS exceeds a threshold voltage of the second switching element Q2, the second switching element Q2 is turned on.

When the first switching element Q1 is turned on, a first current path is generated through the input voltage source V1, the inductor L and the first switching element Q1 and an energy is accumulated at the inductor L.

When the second switching element Q2 is turned on, a second current path is generated through the input voltage source V1, the inductor L and the second switching element Q2 and an energy is accumulated at the inductor L.

When the first and second switching elements Q1 and Q2 are turned off, a third current path is generated through the input voltage source V1, the inductor L and the diode D and the energy accumulated at the inductor L is added to an input voltage V1 from the input voltage source V1 so that the current flows to a load LS through the diode D. According to some example embodiments, the load LS may be a string of light emitting diodes. An output voltage V2 greater than the input voltage V1 is applied to the load LS.

The controller CO may include a main operator OP comparing a first duty ratio of a first current IQ1 flowing through the first switching element Q1 and a second duty ratio of a second current IQ2 flowing through the second switching element Q2, decreasing the first duty ratio when the first duty ratio is greater than the second duty ratio and decreasing the second duty ratio when the second duty ratio is greater than the first duty ratio.

The DC to DC converter may further include a first resistor R1 connected to the first switching element Q1 in series and a second resistor R2 connected to the second switching element Q2 in series. The first resistor R1 may sense the first current IQ1. The second resistor R2 may sense the second current IQ2.

The controller CO may further include a first amplifier AMP1 connected to the first resistor R1 and a second amplifier AMP2 connected to the second resistor R2. The controller CO may further include a first counter CN1 and a second counter CN2. The first counter CN1 determines the first duty ratio of the amplified first current IQ1. The second counter CN2 determines the second duty ratio of the amplified second current IQ2. The controller CO may further include a first comparator CP1 and a second comparator CP2. The first comparator CP1 generates a first control voltage VGSC1 using a first duty ratio control signal, a compensating signal COMP and a clock signal CKS. The second comparator CP2 generates a second control voltage VGSC2 using a second duty ratio control signal, the compensating signal COMP and the clock signal CKS.

The controller CO may further include a first buffer B1 and a second buffer B2. The first buffer B1 transmits the first control voltage VGSC1 outputted from the output terminal of the first comparator CP1 to the control electrode of the first switching element Q1. The second buffer B2 transmits the second control voltage VGSC2 outputted from the output terminal of the second comparator CP2 to the control electrode of the second switching element Q2.

Although not explained referring to figures, the controller CO according to some example embodiments may further include the delay circuits which are explained referring to FIG. 6.

According to some example embodiments, the DC to DC converter includes the plurality of switching element Q1 and Q2 so that the voltage converting of the high level may be operated. In addition, the difference of the threshold voltages of the switching elements Q1 and Q2 is compensated so that the heat of the DC to DC converter including the switching elements Q1 and Q2 may be prevented. Thus, the DC voltage having the high level may be stably generated so that the reliability of the DC to DC converter and the display apparatus including the DC to DC converter may be enhanced.

According to some example embodiments of the DC to DC converter and the display apparatus including the DC to DC converter, the voltage converting of the high level may be operated and the reliability of the DC to DC converter and the display apparatus may be enhanced.

The foregoing is illustrative of aspects of some example embodiments of the present invention and is not to be construed as limiting thereof. Although aspects of some example embodiments of the present invention have been described, those skilled in the art will readily appreciate that many modifications are possible in the example embodiments without materially departing from the novel teachings and aspects of the present invention. Accordingly, all such modifications are intended to be included within the scope of the present invention as defined in the claims, and their equivalents. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims, and their equivalents. The present invention is defined by the following claims, with equivalents of the claims to be included therein.

What is claimed is:

1. A DC to DC converter comprising:
   an input voltage source;
   an inductor connected to the input voltage source;
   a diode connected to the inductor;
   a capacitor connected to the diode;
   a plurality of switching elements connected to a node between the inductor and the diode, wherein the switching elements are connected to each other in a parallel connection; and
   a controller configured to set duty ratios of currents flowing through the switching elements that are connected to each other in the parallel connection and to the node between the inductor and the diode such that the duty ratios of the currents flowing through the switching elements are equal to each other.

2. The DC to DC converter of claim 1, wherein the switching elements comprise a first switching element and a second switching element,
   wherein the controller comprises a main operator, wherein the main operator is configured to:
   compare a first duty ratio of a first current flowing through the first switching element and a second duty ratio of a second current flowing through the second switching element;

decrease the first duty ratio when the first duty ratio is greater than the second duty ratio; and decrease the second duty ratio when the second duty ratio is greater than the first duty ratio.

3. The DC to DC converter of claim 2, further comprising:
a first resistor connected to the first switching element in series, the first resistor being configured to sense the first current; and
a second resistor connected to the second switching element in series, the second resistor being configured to sense the second current.

4. The DC to DC converter of claim 3, wherein the controller further comprises:
a first amplifier comprising a first input terminal connected to a first end of the first resistor and a second input terminal connected to a second end of the first resistor and an output terminal, the first amplifier being configured to amplify the first current;
a second amplifier comprising a first input terminal connected to a first end of the second resistor and a second input terminal connected to a second end of the second resistor and an output terminal, the second amplifier being configured to amplify the second current;
a first counter configured to determine the first duty ratio of the amplified first current; and
a second counter configured to determine the second duty ratio of the amplified second current.

5. The DC to DC converter of claim 4, wherein the controller further comprises:
a first comparator comprising a first input terminal configured to receive a first duty ratio control signal from the main operator and a compensating signal, a second input terminal configured to receive a clock signal and an output terminal;
a second comparator comprising a first input terminal configured to receive a second duty ratio control signal from the main operator and the compensating signal, a second input terminal configured to receive the clock signal and an output terminal;
a first buffer configured to transmit a first control voltage output from the output terminal of the first comparator to a control electrode of the first switching element; and
a second buffer configured to transmit a second control voltage output from the output terminal of the second comparator to a control electrode of the second switching element.

6. The DC to DC converter of claim 5, wherein the controller further comprises:
a first delay circuit configured to delay timing of the first control voltage; and
a second delay circuit configured to delay timing of the second control voltage.

7. The DC to DC converter of claim 6, wherein the first delay circuit comprises a first group of buffers including the first buffer and a first group of switches configured to set a path of transmitting the first control voltage, and
wherein the second delay circuit comprises a second group of buffers including the second buffer and a second group of switches configured to set a path of transmitting the second control voltage.

8. The DC to DC converter of claim 5, wherein the switching elements further comprise a third switching element,
further comprising a third resistor connected to the third switching element in series, the third resistor being configured to sense a third current flowing through the third switching element.

9. The DC to DC converter of claim 8, wherein the controller further comprises:
a third amplifier comprising a first input terminal connected to a first end of the third resistor and a second input terminal connected to a second end of the third resistor and an output terminal, the third amplifier being configured to amplify the third current; and
a third counter configured to determine a third duty ratio of the amplified third current.

10. The DC to DC converter of claim 9, wherein the controller further comprises:
a third comparator comprising a first input terminal configured to receive a third duty ratio control signal from the main operator and the compensating signal, a second input terminal configured to receive the clock signal and an output terminal; and
a third buffer configured to transmit a third control voltage output from the output terminal of the third comparator to a control electrode of the third switching element.

11. A display apparatus comprising:
a display panel configured to display an image;
a gate driver configured to output a gate signal to the display panel;
a data driver configured to output a data voltage to the display panel;
a backlight configured to provide light to the display panel; and
a backlight driver configured to output a backlight driving signal to drive the backlight to the backlight, the backlight driver comprising a DC to DC converter,
wherein the DC to DC converter comprises:
an input voltage source;
an inductor connected to the input voltage source;
a diode connected to the inductor;
a capacitor connected to the diode;
a plurality of switching elements connected to a node between the inductor and the diode, wherein the switching elements are connected to each other in a parallel connection; and
a controller configured to set duty ratios of currents flowing through the switching elements that are connected to each other in the parallel connection and to the node between the inductor and the diode such that the duty ratios of the currents flowing through the switching elements are equal to each other.

12. The display apparatus of claim 11, wherein the switching elements comprise a first switching element and a second switching element,
wherein the controller comprises a main operator configured to:
compare a first duty ratio of a first current flowing through the first switching element and a second duty ratio of a second current flowing through the second switching element;
decrease the first duty ratio when the first duty ratio is greater than the second duty ratio; and
decrease the second duty ratio when the second duty ratio is greater than the first duty ratio.

13. The display apparatus of claim 12, wherein the DC to DC converter further comprises:
a first resistor connected to the first switching element in series, the first resistor being configured to sense the first current; and
a second resistor connected to the second switching element in series, the second resistor being configured to sense the second current.

14. The display apparatus of claim 13, wherein the controller further comprises:
- a first amplifier comprising a first input terminal connected to a first end of the first resistor and a second input terminal connected to a second end of the first resistor and an output terminal, the first amplifier being configured to amplify the first current;
- a second amplifier comprising a first input terminal connected to a first end of the second resistor and a second input terminal connected to a second end of the second resistor and an output terminal, the second amplifier being configured to amplify the second current;
- a first counter configured to determine the first duty ratio of the amplified first current; and
- a second counter configured to determine the second duty ratio of the amplified second current.

15. The display apparatus of claim 14, wherein the controller further comprises:
- a first comparator comprising a first input terminal configured to receive a first duty ratio control signal from the main operator and a compensating signal, a second input terminal configured to receive a clock signal and an output terminal;
- a second comparator comprising a first input terminal configured to receive a second duty ratio control signal from the main operator and the compensating signal, a second input terminal configured to receive the clock signal and an output terminal;
- a first buffer configured to transmit a first control voltage output from the output terminal of the first comparator to a control electrode of the first switching element; and
- a second buffer configured to transmit a second control voltage output from the output terminal of the second comparator to a control electrode of the second switching element.

16. A display apparatus comprising:
- a display panel configured to display an image;
- a gate driver configured to output a gate signal to the display panel;
- a data driver configured to output a data voltage to the display panel; and
- a power voltage generator configured to output a gate power voltage to the gate driver and a data power voltage to the data driver, the power voltage generator comprising a DC to DC converter, wherein the DC to DC converter comprises:
an input voltage source;
- an inductor connected to the input voltage source;
- a diode connected to the inductor;
- a capacitor connected to the diode;
- a plurality of switching elements connected to a node between the inductor and the diode, wherein the switching elements are connected to each other in a parallel connection; and
- a controller configured to set duty ratios of currents flowing through the switching elements that are connected to each other in the parallel connection and to the node between the inductor and the diode such that the duty ratios of the currents flowing through the switching elements are equal to each other.

17. The display apparatus of claim 16, wherein the DC to DC converter is configured to generate a gate on voltage which defines a high level of the gate signal.

18. The display apparatus of claim 16, wherein the DC to DC converter is configured to generate an analog power voltage to operate the data driver.

19. The display apparatus of claim 16, wherein the switching elements comprise a first switching element and a second switching element,
wherein the controller comprises a main operator configured to:
compare a first duty ratio of a first current flowing through the first switching element and a second duty ratio of a second current flowing through the second switching element;
decrease the first duty ratio when the first duty ratio is greater than the second duty ratio; and
decrease the second duty ratio when the second duty ratio is greater than the first duty ratio.

* * * * *